United States Patent [19]

Pavur

[11] Patent Number: 4,685,173
[45] Date of Patent: Aug. 11, 1987

[54] GROMMET WITH ANGULARLY POSITIONABLE TUBULAR PORTION

[75] Inventor: Carol P. Pavur, Warren, Mich.

[73] Assignee: Chrysler Motors Corporation, Highland Park, Mich.

[21] Appl. No.: 882,650

[22] Filed: Jul. 7, 1986

[51] Int. Cl.$^4$ .............................................. F16L 5/00
[52] U.S. Cl. ...................................... 16/2; 174/153 G
[58] Field of Search ............. 16/2; 248/56; 174/65 G, 174/152 G, 153 G

[56] References Cited

U.S. PATENT DOCUMENTS

| | | | |
|---|---|---|---|
| 1,800,578 | 4/1931 | Webb | 16/2 X |
| 2,897,533 | 8/1959 | Bull et al. | 248/56 |
| 3,518,359 | 6/1970 | Trimble et al. | 174/153 G |
| 3,749,818 | 7/1973 | Jemison | 16/2 X |
| 4,000,875 | 1/1977 | Jemison et al. | 248/56 |
| 4,056,252 | 11/1977 | Simon | 248/56 |

Primary Examiner—Fred Silverberg
Attorney, Agent, or Firm—Edward P. Barthel

[57] ABSTRACT

A one-piece grommet having a central elongated tubular portion surrounded by a cylindrical rim portion. One end of the rim portion is formed with a continuous laterally extending mounting flange spaced from an annular detent shoulder defining an annular groove for securing the grommet in a panel opening. A thin-walled resilient frusto-conical web portion connects the rim portion to the tubular portion. The web small diameter end forms a juncture with one end of the rim portion in the transverse plane of the annular groove while the web large diameter end forms a juncture with the rim portion other end at a predetermined axial distance from the transverse plane. This offset web arrangement allows the tubular portion to be positioned at any desired angle relative to the panel while maintaining the grommet annular groove in sealed engagement with the panel opening.

1 Claim, 6 Drawing Figures

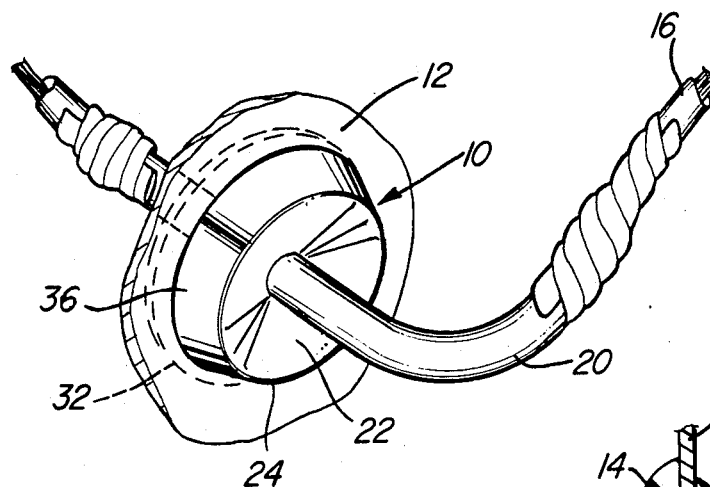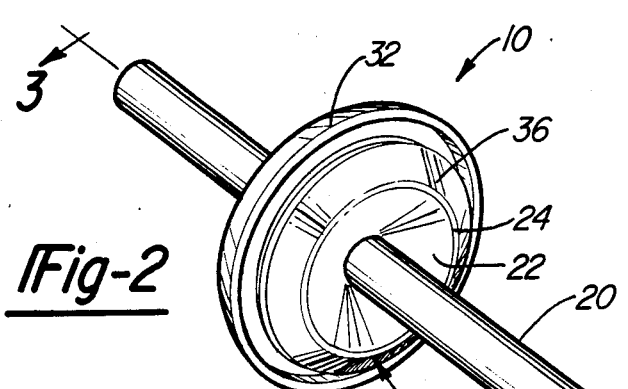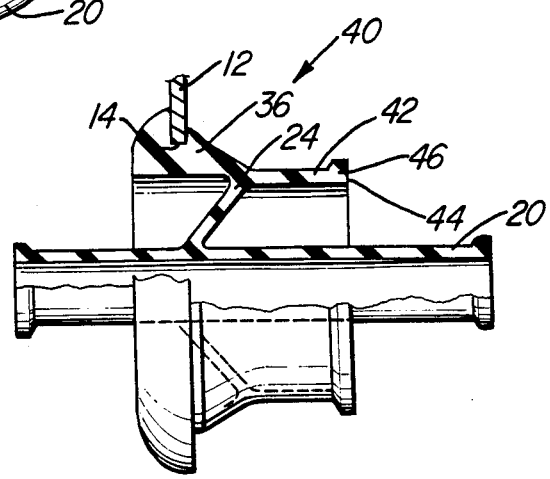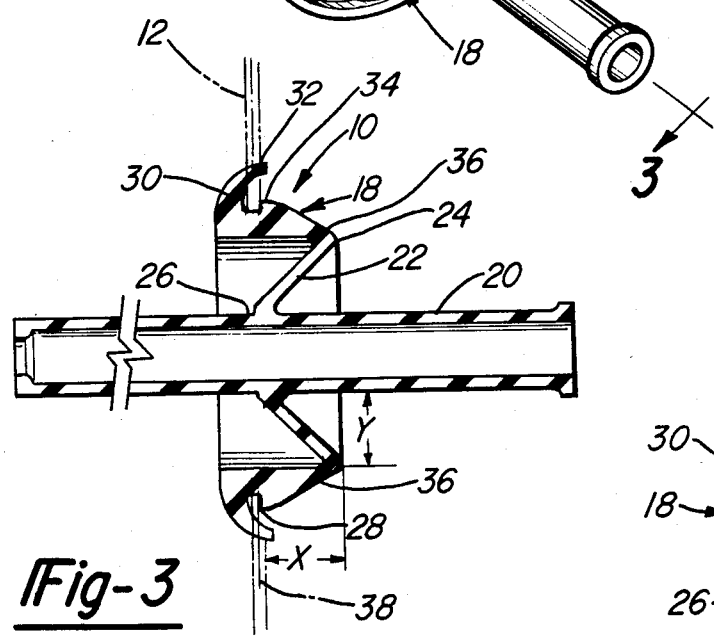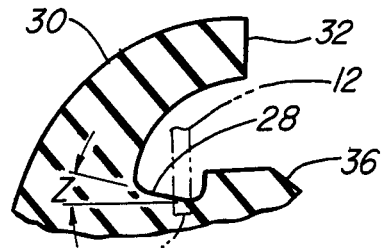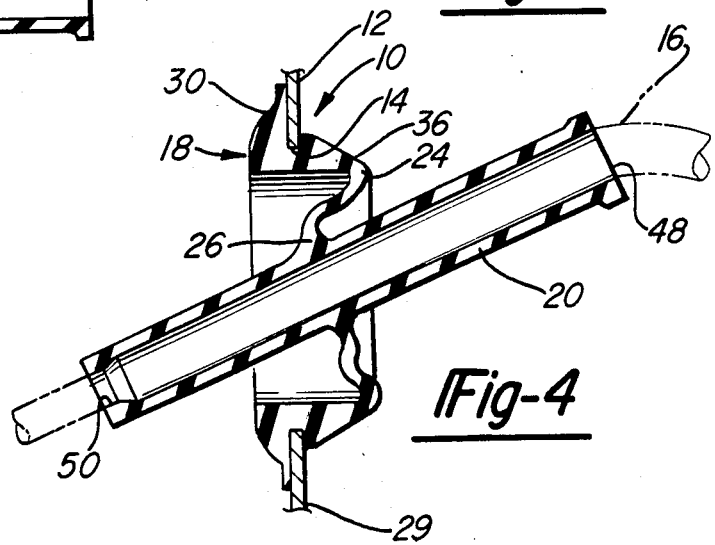

GROMMET WITH ANGULARLY POSITIONABLE TUBULAR PORTION

BACKGROUND OF THE INVENTION

This invention relates to grommets and more particularly to grommets for sealing a line or cable passing through an opening in a vehicle bulkhead or panel.

In the securing of electrical wires, cables, hydraulic lines, and other elongated elements, through vehicle bulkhead or panel openings, their support grommets are subjected to vibration pull-out forces and the like. Also, the elongated elements must allow for low profile routing wherein the elements are bent at steep angles on either side of the panel. As a result it has long been a problem to prevent the grommets from unseating and developing leaks that allow the passage of air, water and foreign matter through the vehicle walls. The U.S. Pat. No. 2,897,533 issued Aug.6, 1959 to Bull et al and U.S. Pat. No. 4,289,924 issued to Pearce, Jr. et al are examples of prior art grommets designed to be sealing mounted within a panel opening.

Still another common problem in vehicle assembly wiring attachment is to provide a grommet that allows quick installation by hand without the necessity for using tools or separate fastening elements. The U.S. Pat. No. 4,487,998 issued Dec. 11, 1984 to Pegram is an example of a grommet employing a release tool.

Special requirements must be met when designing an expandable and applied flexible grommet intended for use in automotive wiring harnesses to prevent leakage around the perimeter or through the center of the grommet resulting from suction or pressure differential between the inside and outside of the vehicle body. An example of a prior art grommet designed to snugly surround an elongated element and at the same time to permit controlled axial and radial movement is shown in U.S. Pat. No. 1,800,578 issued April 14, 1931 to Webb.

These and other disadvantages in prior devices have necessitated the maintenance of an inventory of different grommets for use with cables of varying sizes and applications. It has been the practice in the automotive industry to employ molded-on vinyl plastic grommets. Such grommets have numerous problems including leakage at their mold parting lines, improper molding techniques, material set, etc. An example of a molded plastic grommet is disclosed in U.S. Pat. No. 4,081,879 issued Apr. 4, 1978 to Rubright.

SUMMARY OF THE INVENTION

The present invention aims at elimination of the drawbacks found in the above-mentioned prior art grommets.

Accordingly, it is an object of the invention to provide an improved grommet member which is capable of sealing against water entry, noise, and dust through both the panel-grommet juncture and through the grommet central passage accommodating cables, wiring bundles, harnesses, hydraulic lines or other elongated elements.

It is another object of the invention to provide an improved grommet which includes an integral tube supporting arrangement permitting ready low-profile cocking of the tube ends allowing routing of the cable at various angles relative to a supporting panel pull-out of the cable or while avoiding moisture travel through the grommet. The improved grommet design also allows for a pressure head routing to overcome leakage caused by a lower pressure differential between the inside and outside of the vehicle passenger compartment.

Still another object of the invention is to provide an improved grommet that facilitates ready hand installation by means of an integral pull-through tube and/or flanged skirt. Also, tape or clamps may be used to mechanically hold the tube to a cable or harness for seating the grommet.

These and other objects and advantages of the invention will be readily apparent by reference to the following description of the preferred embodiments and appended drawings.

BRIEF DESCRIPTION OF THE DRAWINGS

FIG. 1 is a perspective view showing a grommet made according to the present invention installed in an automobile panel;

FIG. 2 is a perspective view of the grommet of FIG. 1 prior to being installed;

FIG. 3 is a vertical sectional view taken on the line 3—3 of FIG. 2;

FIG. 4 is a view similar to FIG. 3 showing the grommet in a low profile routing mode;

FIG. 5 is a vertical sectional view similar to FIG. 3 showing a modified form of the invention; and FIG. 6 is an enlarged fragmentary detailed cross-sectional view of the annular groove portion of the grommets of FIGS. 1–4 and FIG. 5.

DETAILED DESCRIPTION OF THE INVENTION

Referring now to the drawings and particularly to FIGS. 1 and 2 wherein an integrally molded grommet is indicated generally at 10 and is adapted to be mounted on a bulkhead or panel 12 so as to seal a circular opening 14 (FIG. 4) formed within the panel. As seen in FIG. 1, a suitable elongated element 16, which may be a wire, cable, conduit, or the like, is supported within the grommet so as to be mounted in spaced relationship to the panel opening.

As best seen in FIGS. 3 and 4 the grommet 10 comprises a flexible outer rim portion 18 concentrically disposed about the principal axis of a central elongated inner tubular or extended sleeve portion 20. The outer rim portion 18 and the inner tubular portion 20 are integrally joined by connecting means in the form of a frusto-conical sectioned web portion 22. FIG. 3 shows the frusto-conical web portion 22 arranged with its large diameter juncture 24 integral with the right hand end of the rim portion 18 and its small diameter juncture 26 integral with an intermediate segment of the tubular portion 20.

A continuous annular groove 28 is formed in the external surface of the rim portion 18. The groove 28 defined in part by a continuous annular radially extending mounting flange 30 having a lip portion 32 projecting over the annular groove 28 towards the large diameter end juncture 24 of the web. A radially extending detent shoulder 34 is axially spaced a predetermined distance from the mounting flange 30. The grommet 10 is formed at its rearward periphery with a frusto-conical surface 36 tapered at a predetermined angle of about 30 degrees from the horizontal from the detent shoulder 34 to the small diameter end juncture 24. As will be explained later the cone surface 36 facilitates assembly of the grommet within the panel circular opening 14 allowing the panel 12 to be received within the annular groove 28 as seen in FIG. 4.

It will be noted in FIG. 3 that the frusto-conical shaped web portion 22 extends upwardly at an angle of about 45 degrees to the principal axis of said tubular portion 20 from the small diameter juncture 26 to the large diameter juncture 24. As a result the large diameter juncture 24 is spaced a predetermined axial distance "X" from the juncture 26 substantially equal to the radial distance "Y" of the juncture 24 from the periphery of the tube 20. By virtue of offsetting the juncture 24 from the annular groove 28 by the distance "X" the tubular portion 20 is permitted free combined axial and radial movement, as seen in FIG. 4. Thus, the tubular portion 20 may be cocked at various angles relative to the panel while maintaining the concentric sealed juncture between the annular groove 28 and the panel circular opening 14.

When the grommet is installed on panel circular opening 14 it will be observed that the conical surface 36 facilitates its initial axial alignment with the opening 14. By the installer grasping the right-hand end of the integral tubular portion 20 after its insertion through the opening 14, the grommet's rearward conical surface 36 centers the rim portion relative to the opening 14. In this manner the grommet is uniformly deformed so that it can be easily pulled through the opening 14 to permit the annular groove 28 to firmly seal around the opening 14 and the contacting rim portion 18 to positively lock the grommet in place preventing pull-out of the cable.

A modified form of the invention is shown in FIG. 5 wherein like parts are given like or corresponding numbers. The grommet 40 of FIG. 5 is formed with a cylindrical skirt portion 42 substantially concentric with the tubular portion 20 with its left hand end molded integral with the large diameter juncture 24. The skirt portion 42 is annular in shape and extends rearwardly from the right hand portion of the tubular member. The skirt free end 44 is positioned a predetermined axial distance from the juncture 24 which in the disclosed embodiment is of the order of 20 mm. The free end 44 terminates in a continuous radially extending lip 46. The skirt portion 42 thus may be readily gripped by the installer and pulled axially causing the grommet to shrink inwardly. This permits the grommet to be easily pulled through the panel opening 14 over the tapered surface 36 until the panel opening 14 is sealingly captured in the annular groove 28.

It will be appreciated that the grommet design of the present invention permits routing of the elongated tubular portion 20 away from moisture flow paths. This is achieved by bending the tubular portion 20 to form a moisture blocking drip loop or drip trap as seen, for example, in FIG. 1 to prevent moisture from entering the vehicle passenger compartment.

Further, and most desirable, the extended tubular portion 20 allows cable routing to provide a differential "pressure head" preventing leakage caused by below atmospheric pressure areas being developed within the vehicle body under certain driving conditions. Thus, as seen in FIG. 4, a vertical height differential between elevated entrance 48 and lowered entrance 50 of the angled tube portion 20 can be readily provided by cocking the tube portion at a predetermined angle. It has been determined that a vertical height differential of one inch or more provides a sufficient pressure head to prevent travel of moisture from the lower entrance 50 to the elevated entrance 48.

FIG. 6 shows an enlarged detail view of the annular groove portion 28 of the grommets of both FIGS. 1–4 and FIG. 5. It will be noted that the groove 28 has a forwardly inclined base portion which normally extends from the detent shoulder 34 toward the mounting flange 30 at a predetermined upwardly inclined acute angle "Z" of the order of 15 degrees from the horizontal. Further, the external minimal diameter of groove inclined based portion is greater than the diameter of the panel opening by a predetermined amount which in the disclosed form is about 1 mm. By virtue of this construction upon the grommet being inserted in the panel circular opening 14 the inclined base portion exerts a radially outward biasing force on the panel opening 14. In this way the groove 28 is retained in positive sealed contact with the panel opening. It will also be noted that the detent shoulder 34 extends rearwardly from the panel a predetermined axial distance, of the order of 3 mm. in the disclosed form. Thus, the shoulder 34 provides sufficient resistance to a pull-out force to prevent the grommet from being dislodged forwardly from the panel opening.

Although the present invention has been shown and described with reference to two preferred embodiments thereof, in terms of the illustrated drawing it should not be considered as limited thereby. Thus, various possible modifications, omissions, and alternatives could be conceived by one skilled in the art without departing from the scope of the present invention.

What is claimed is:

1. A one-piece elastomeric grommet for passing one or more flexible elongated conduits through a panel circular opening in a vehicle passenger compartment, said grommet comprising a central tubular portion aligned on a longitudinal axis, a cylindrical outer rim portion having first and second longitudinal ends concentrically surrounding an intermediate length of said tubular portion, a laterally extending mounting flange on said rim portion first longitudinal end spaced from a laterally extending detent shoulder defining an annular groove therebetween for securing the grommet in the opening with the panel sealingly received between said mounting flange and said detent shoulder, and means connecting said rim portion and said tubular portion, the improvement wherein said tubular portion having an elongated hollow constant diameter cylindrical shape with first and second free ends, said tubular portion normally extending longitudinally such that its first end is positioned a predetermined minimal axial distance beyond said rim first end, said tubular portion having a central uniform passage normally aligned on said longitudinal axis adapted to receive the conduit therein, said rim portion formed with an interior cylindrical surface spaced outwardly from said tubular portion a predetermined radial distance substantially equal to said tubular portion diameter, said rim portion having a conical surface tapered inwardly at an acute angle of about 30 degrees from said detent shoulder to said rim portion second end, said connecting means in the form of a thin-walled resilient frustoconical web portion having a large diameter end and a small diameter end, said web portion large diameter end forming an integral large diameter juncture with said rim portion second end, said web portion small diameter end forming an integral small diameter juncture with the outer periphery of said tubular portion at a location intermediate its ends such that said small diameter juncture lies generally in the plane in which the panel lies when received in said annular groove, said large diameter juncture being spaced from said small diameter juncture a predetermined axial distance substantially equal to the radial distance between said large diameter juncture and said tubular portion outer periphery, said web portion providing controlled resilient deformation thereby allowing said tubular portion and the conduit routed therethrough to be cocked at various angles relative to the panel, said annular groove having an inclined base portion which normally extends from said detent shoulder toward said mounting flange at a predetermined upwardly inclined acute angle of the order of 15 degrees from the horizontal and wherein the external minimal diameter of said groove base portion is greater than the diameter of the panel circular opening by a predetermined amount, such that upon said grommet being inserted in the panel opening said annular groove base portion exerting a radially outward force thereby insuring sealing contact between said annular groove and the panel, whereby by virtue of said web portion large diameter juncture being positioned said predetermined axial distance from the panel said grommet maintains its rim portion annular groove in concentric sealed contact with the panel opening upon said tubular portion being cocked at various angles; and wherein said grommet integrally formed with a manual gripping portion in the form of a cylindrical skirt disposed in an axially extending concentric manner about said tubular portion, said skirt having its one end integral with said web portion large diameter juncture and its other free end formed with a radially extending lip, said skirt extending longitudinally toward said tubular portion second free end an axial distance substantially equal to the axial extent of said rim portion, and said tubular portion second free end positioned said predetermined minimal distance beyond said skirt free end, whereby said skirt is adapted for readily mounting said grommet in the panel opening by said skirt lip being grasped and pulled axially therethrough causing said grommet rim portion to shrink inwardly thus cooperating with said rim portion conical surface as said annular groove is captured in the panel opening.

* * * * *